(12) United States Patent
Sonetaka

(10) Patent No.: US 6,359,869 B1
(45) Date of Patent: Mar. 19, 2002

(54) MOBILE COMMUNICATION SYSTEM CAPABLE OF ESTABLISHING FRAME SYNCRONIZATION AMONG BASE STATIONS

(75) Inventor: Noriyoshi Sonetaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/104,390

(22) Filed: Jun. 25, 1998

(30) Foreign Application Priority Data

Jun. 25, 1997 (JP) .............................................. 9-183236
Jun. 25, 1997 (JP) .............................................. 9-183238

(51) Int. Cl.$^7$ ................................................. H04J 3/06
(52) U.S. Cl. ........................ 370/337; 370/350; 370/507
(58) Field of Search ................................ 370/350, 507, 370/509, 280, 294, 324, 336, 337, 345, 347

(56) References Cited

U.S. PATENT DOCUMENTS 5,519,759 A * 5/1996 Heineck et al. ................ 379/59
5,537,685 A * 7/1996 Matsuno ..................... 455/51.1

FOREIGN PATENT DOCUMENTS

| JP | 2-164140 | 6/1990 |
| JP | 5-235833 | 9/1993 |
| JP | 5-308334 | 11/1993 |
| JP | 6-338847 | 12/1994 |
| JP | 7-154849 | 6/1995 |
| JP | 9-27986 | 1/1997 |

* cited by examiner

Primary Examiner—Melvin Marcelo
(74) Attorney, Agent, or Firm—McGinn & Gibb, PLLC

(57) ABSTRACT

In a time divisional multiple access type mobile communication system including a plurality of base stations, each of the base stations receiving broadcast signals from the other base stations, and determining a broadcast transmission timing in synchronization with and different from timings of the received broadcast signals. Then, a broadcast signal is transmitted at the broadcast transmission timing.

15 Claims, 15 Drawing Sheets

TDMA

TDMA/TDD

B : BROADCAST CONTROL CHANNEL
T : TRAFFIC CHANNEL

Fig. 3
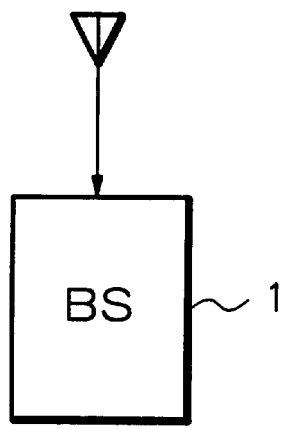
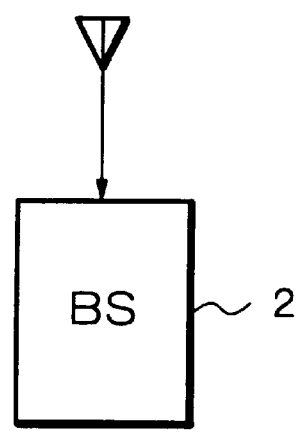
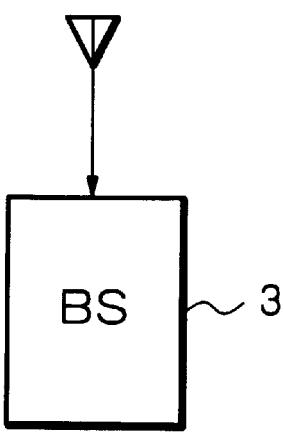
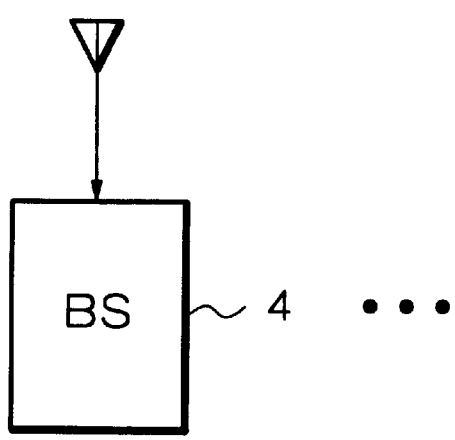

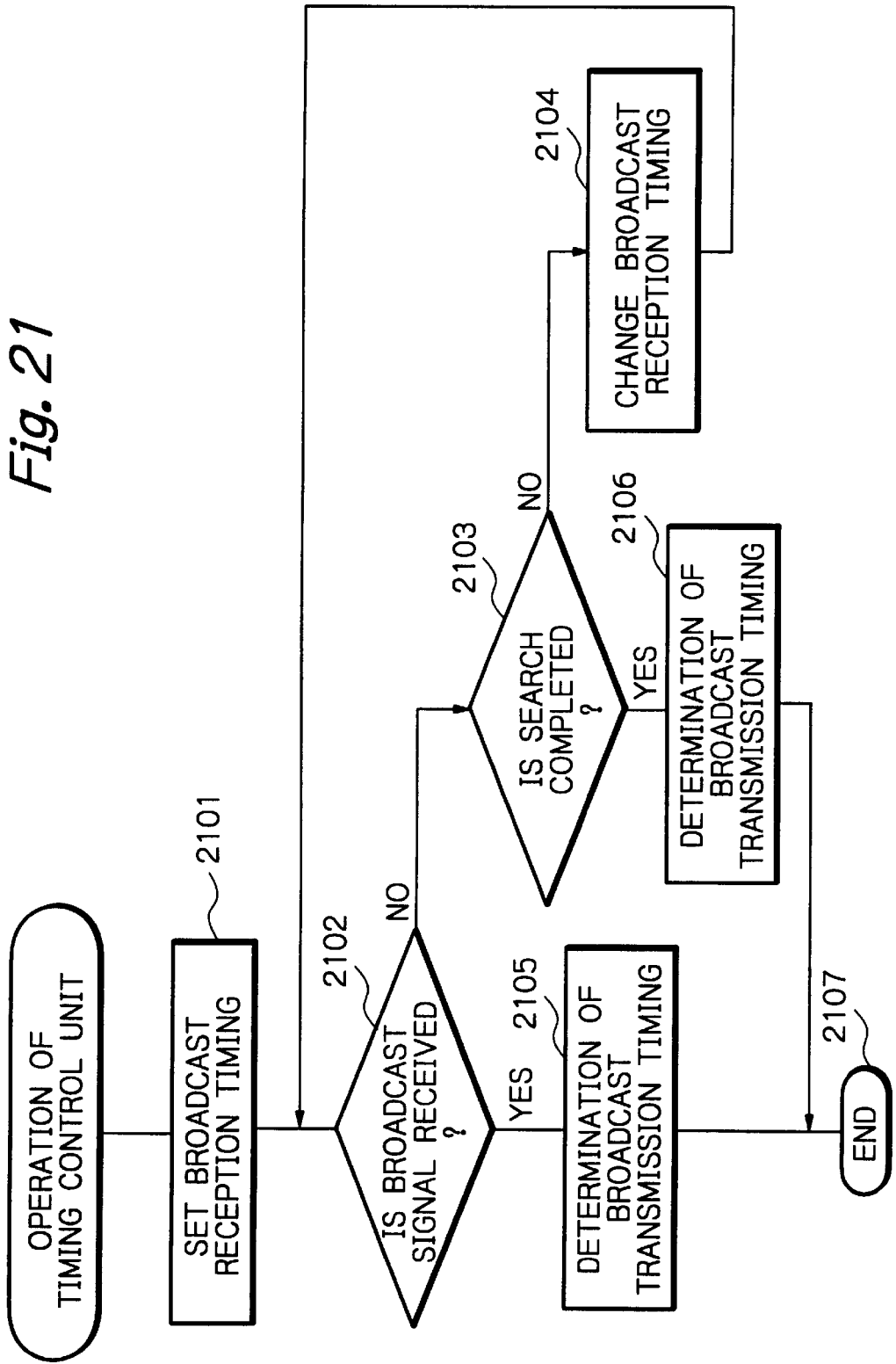

MOBILE COMMUNICATION SYSTEM CAPABLE OF ESTABLISHING FRAME SYNCRONIZATION AMONG BASE STATIONS

BACKGROUND OF THE INVENTION

1. Field of the Invention

The present invention relates to a time division multiple access (TDMA) type or a time division multiple access/time division duflex (TDMA/TDD) type mobile cummunication system.

2. Description of the Related Art

In a mobile cummunication system including a plurality of base stations, frame synchronization is needed among the base stations.

A prior art frame synchronization establishing method is carried out by a contrtol station connected to the base stations using signals of a mobile station (see JP-A-2 164140, JP-A-6-338847 & JP-A-7-154849). This will be explained later in detail.

In the above-described prior art frame synchronization method, however, since the distance between each of the base stations and the control station is not equal, the synchronization signals for the base stations are not accurate in view of the frame synchronization. Therefore, each of the base stations includes means for calculating a difference in time between a signal transmitted from the mobile station and a signal which is also the transmitted signal of the mobile station received by the other base station, and means for adjusting the synchronization signals in accordance with the difference in time. In addition, if an additional base station is provided, the establishment of frame synchronization needs to be carried out for the entire system including the additional base station, which is a problem in practice.

SUMMARY OF THE INVENTION

It is an object of the present invention to provide a mobile communication system capable of establishing frame synchronization among base stations, without a special control unit for establishing frame synchronization.

Another object is to carry out frame synchronization without changing the entire system, even when an additional base station is provided.

According to the present invention, in a time divisional multiple access type mobile communication system including a plurality of base stations, each of the base stations receives broadcast signals from the other base stations, and determines a broadcast transmission timing in synchronization with and different from timings of the received broadcast signals. Then, a broadcast signal is transmitted at the broadcast transmission timing.

BRIEF DESCRIPTION OF THE DRAWINGS

The present invention will be more clearly understood from the description as set forth below, as compared with the prior art, with reference to the accompanying drawings, wherein:

FIG. 3 is a block circuit diagram illustrating an embodiment of the mobile communication system according to the present invention;

FIG. 21 is a flowchart showing a second operation of the timing control unit of FIG. 4.

DESCRIPTION OF THE PREFERRED EMBODIMENT

Before the description of the preferred embodiment, a prior art mobile communication system will be explained with reference to FIGS. 1A, 1B and 2.

Figure 1A:
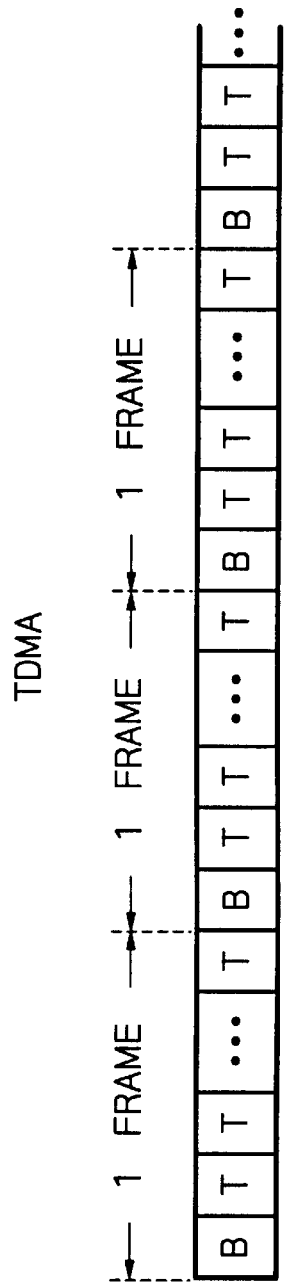
FIG. 1A is a timing diagram showing channels of a TDMA system.

In FIG. 1A, which is a timing diagram showing a TDMA system, broadcast control channels B are allocated to special time slots and traffic channels are allocated to other time slots. In this case, one frame is formed by one broadcast control channel B and a predetermined number of traffic channels. Also, in FIG. 1B. which is a timing diagram showing a TDMA/TDD system, one frame is formed by a transmitting sub frame TX and a receiving sub frame RX. In this case, one broadcast control channel B is allocated to each sub frame.

Figure 1B:
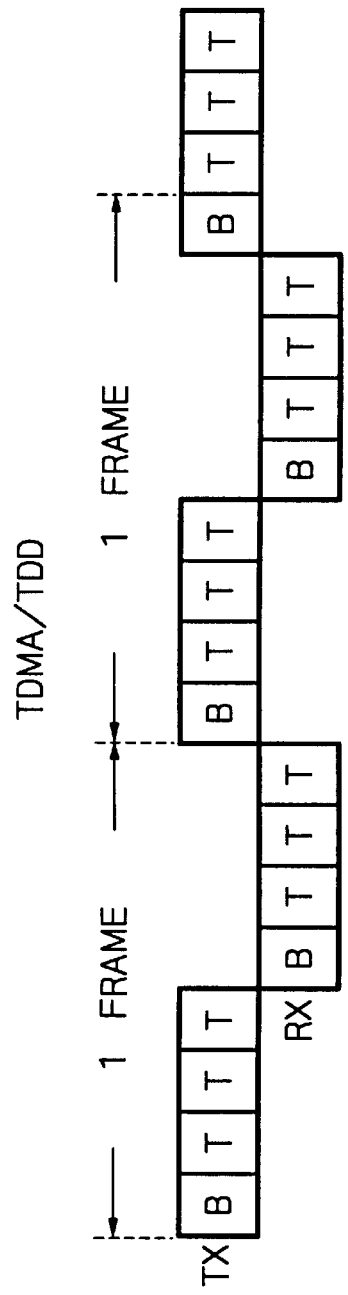
FIG. 1B in is a timing diagram showing channels of a TDMA/TDD system.

In the TDMA/TDD system as shown in FIG. 1B, two broadcast control channels are allocated to each frame; however, in this case, since the two broadcast control channels are fixed within the frame, the two broadcast control channels correspond to one broadcast control channel of the TDMA system as shown in FIG. 1A.

Figure 2:
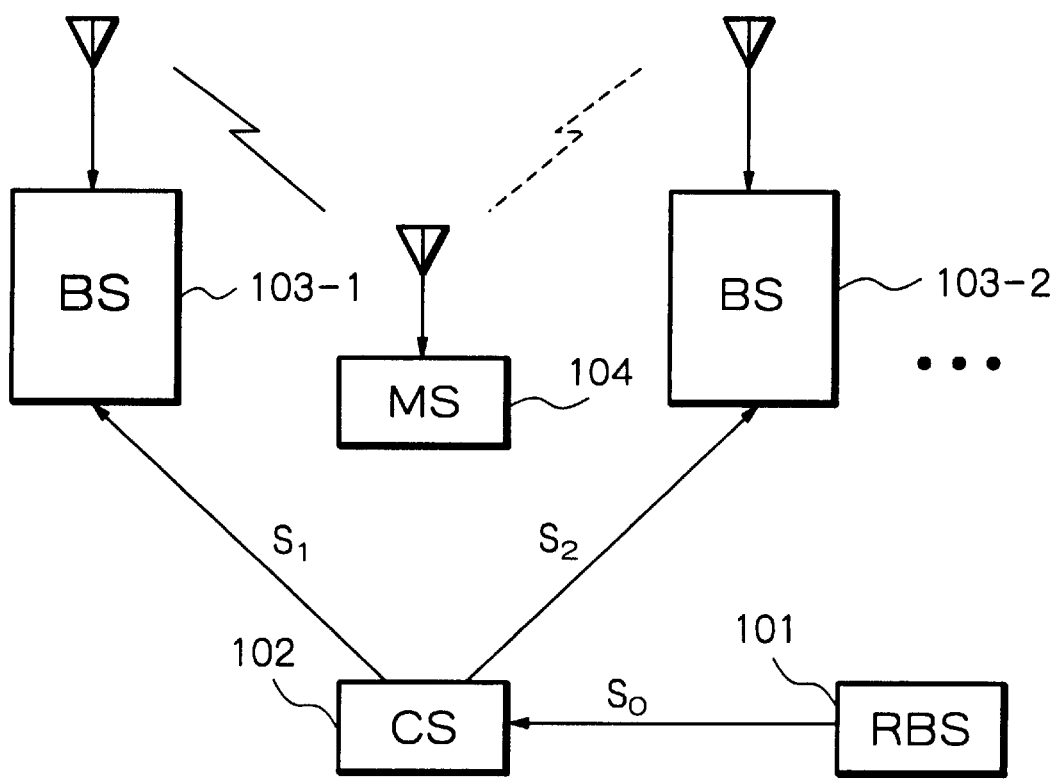
FIG. 2 is a block circuit diagram illustrating a prior art mobile communication system.

In FIG. 2, which illustrates a prior art mobile communication system (see JP-A-6-338847), reference numeral 101 designates a reference base station which is connected to a control station 102. The control station 102 supervises a plurality of base stations such as 103-1 and 103-2. Radio communication is carried out between the base stations 103-1, 103-2, . . . and a mobile station 104. In this case, such of the base stations 103-1, 103-2, . . . is allocated to one frame as shown in FIG. 1A or 1B. For this purpose, the reference base station 101 generates a frame synchronization signal So and transmits it to the control station 102. Then, upon receipt of the frame synchronization signal So,. the control station 102 generates synchronization signals $S_1$, $S_2$, . . . and transmits them to the base stations 103-1, 103-2, . . . . In this case, the synchronization signals $S_1$, $S_2$, . . . are shifted from each other by a time corresponding to one or more frames as shown in FIG. 1A and 1B. Thus, a frame synchronization is realized among the base stations 103-1, 103-2, . . .

In the above-described prior art mobile communication system, however, since the distance between each of the base stations 103-1, 103-2, . . . and the control station is not equal the synchronization signals $S_1$, $S_2$ . . . are not accurate in view of the frame synchronization. Therefore, each of the base stations 103-1, 103-2, . . . includes means for calculating a difference in time between a signal transmitted from the mobile station 104 and a signal which is also the transmitted signal of the mobile station 104 received by the other base station, and means for adjusting the synchronization signals $S_1, S_2, \ldots$ in accordance with the difference in time.

In FIG. 3, which illustrates an embodiment of the mobile communication system according to the present invention, base stations 1, 2, ... are provided. In this case, the control station 102 of FIG. 2 is unnecessary for establishment of frame synchronization, and accordingly, the reference base station 101 of FIG. 2 is not provided. Note that the control station 102 of FIG. 2 is actually provided for other purposes than the establishment of frame synchronization.

Figure 4:
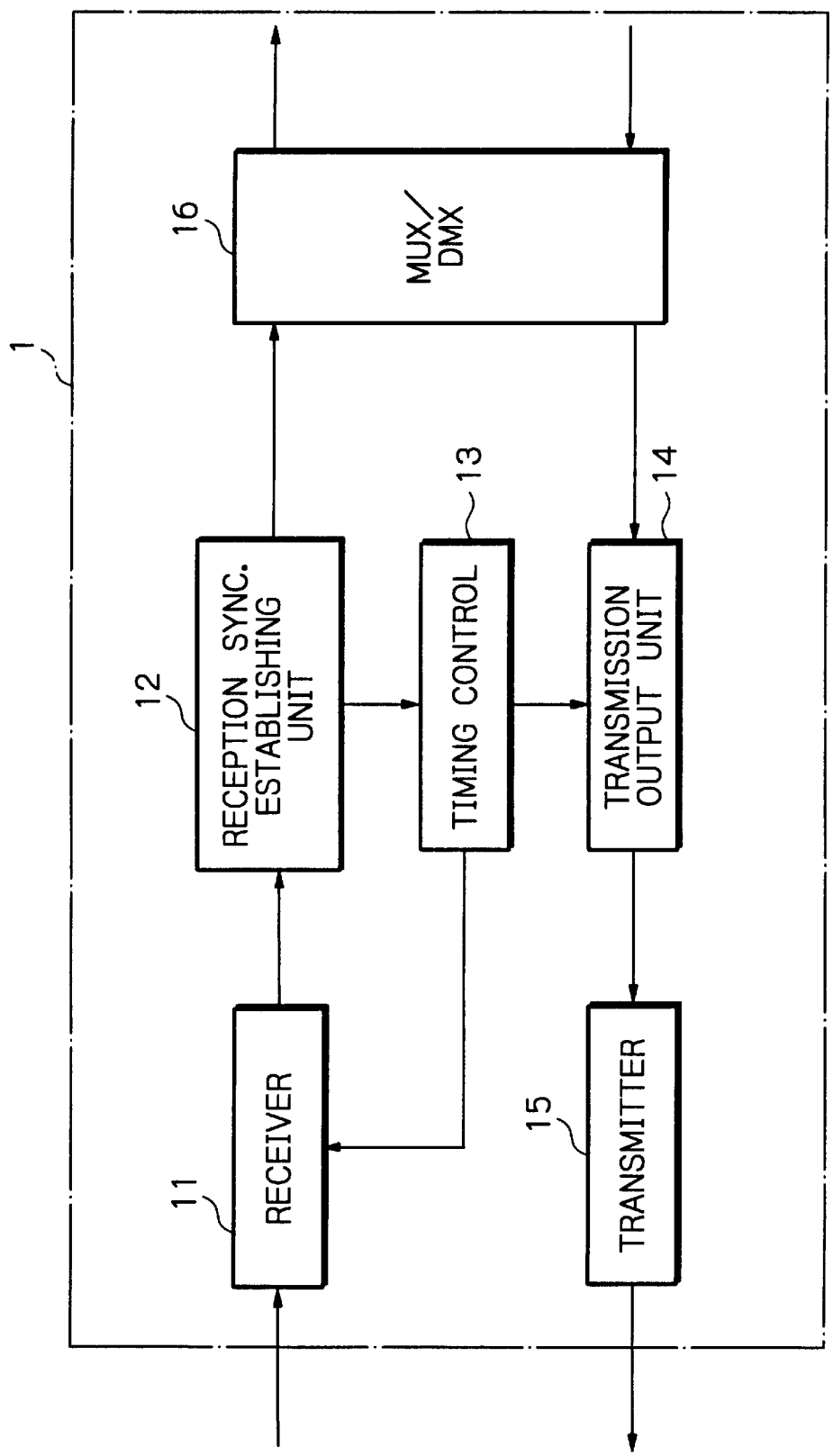
FIG. 4 is a detailed block circuit diagram of the base station of FIG. 3.

In FIG. 4, which is a detailed circuit diagram of the base station such as 1, a receiver 11, a reception synchronization establishment unit 12, a timing control unit 13, a transmission output unit 14 and a transmitter 15 are provided.

When the base station 1 is powered ON, the receiver 11 receives and demodulates a signal from one of the other base stations in accordance with the timing control unit 13, and transimits it to the reception synchronization establishment unit 12.

The reception synchronization establishment unit 12 extracts a broadcast signal from the demodulated signal and transmits it to the timing control unit 13.

Figure 5:
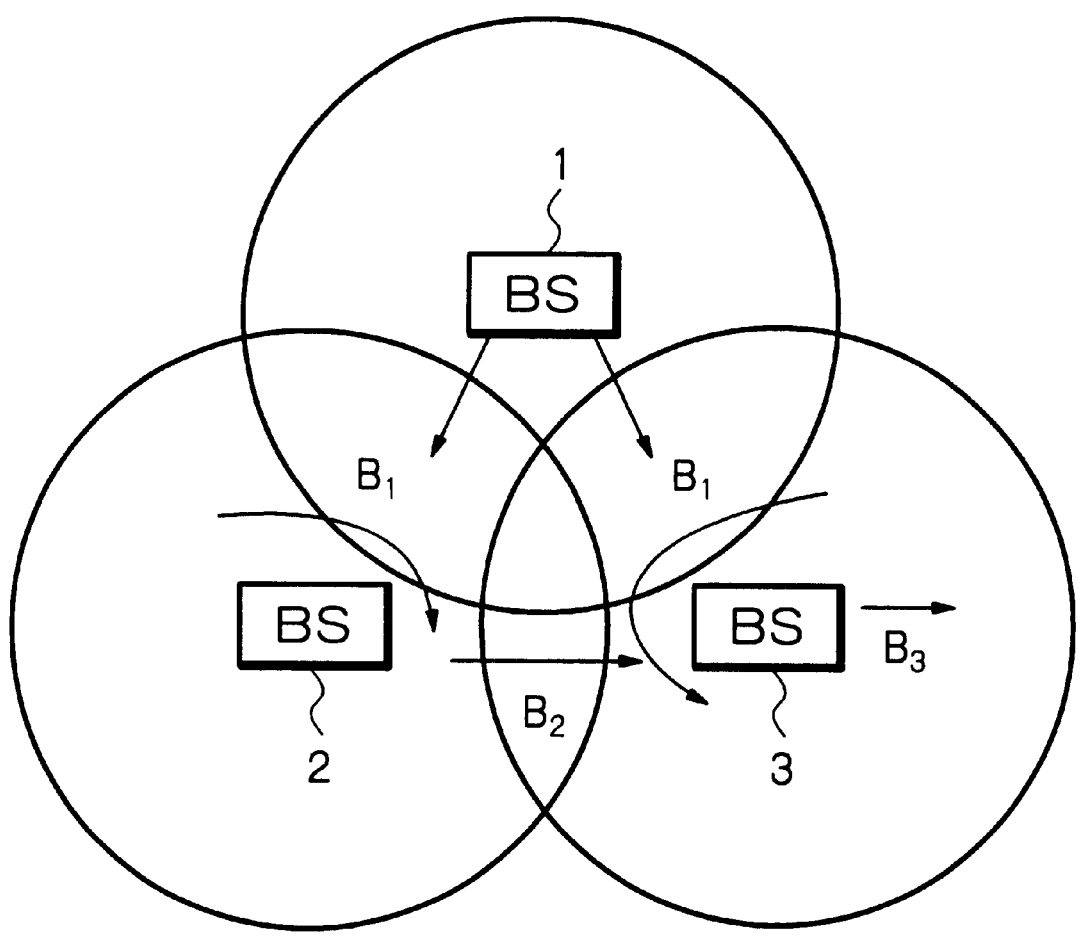
FIG. 5 is a diagram showing an operation of the system of FIG. 3.

The timing control unit 13 determines a broadcast signal transmission timing of this base station in accordance with the broadcast signal of the other base station. That is, as shown in FIG. 5, if the base station 1 generates a broadcast signal B, at a first broadcast timing and base station 2 is powered ON, the base station 2, i.e., the timing control unit thereof searches for the broadcast signal $B_1$ of the base station 1. As a result, the timing control unit of the base station 2 determines a second broadcast timing which is different from the first broadcast timing, and the base station 2 generates a broadcast signal $B_2$ at the second broadcast timing. Similarly, if the base stations 1 and 2 generate broadcast signals $B_1$ and $B_2$ at first and second broadcast timings, respectively, and base station 3 is powered ON, the base station 3, i.e., the timing control unit thereof searches for the broadcast signals $B_1$ and $B_2$ of the base stations 1 and 2. As a result, the timing control unit of the base station 3 determines a third broadcast timing which is different from the first and second broadcast timings, and the bass station 3 generates a broadcast signal $B_3$ at the third broadcast timing. Note that each interval of the first, second and third broadcast timings is a time corresponding to one or more frames. Also, a signal multiplex/demultiplex control unit 16 is provided for demultiplexing a received TDMA (or TDMA/TDD) signal and multiplexing a transmission TDMA (or TDMA/TDD) signal.

The transmission output unit 14 receives a transmission signal including a broadcast signal from the signal multiplex/demultiplex control unit 16 and transmits it to the transmitter 15 at a timing defined by the timing control unit 13. Thus, the transmission signal is transmitted from the transmitter 15 at such a timing.

Figure 6:
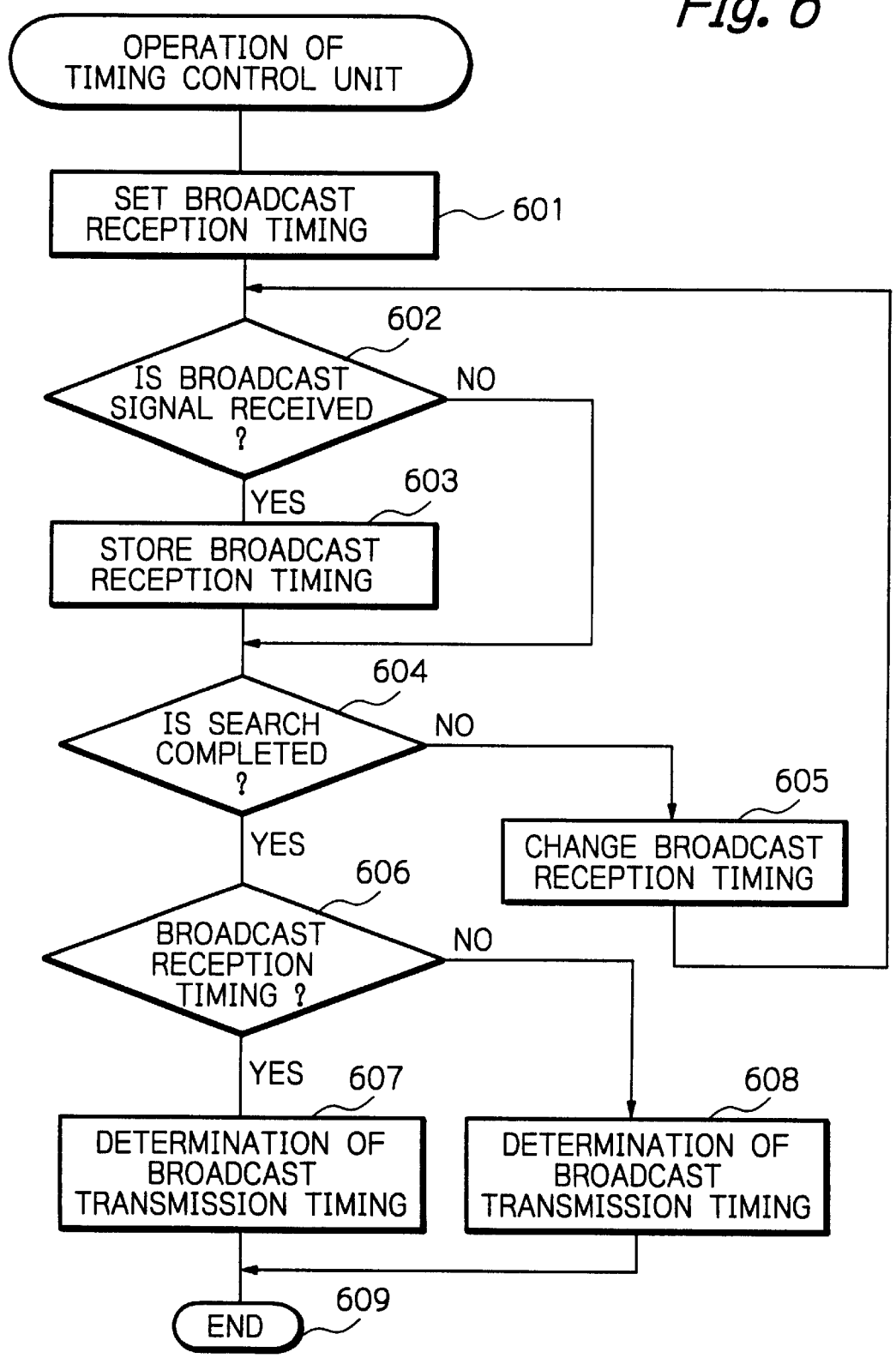
FIG. 6 is a flowchart showing a first operation of the timing control unit of FIG. 4.

A first operation of the timing control unit 13 of FIG. 4 is explained with reference to a flowchart of FIG. 6. The flowchart of FIG. 6 is started when the base station is powered ON.

Firstly, at step 601, a broadcast reception timing is initially set for searching a broadcast signal from one of the other base stations.

Next, at step 602, it is determined whether or not a broadcast signal is received at the reception synchronization establishment unit 12. Only if such a broadcast signal is received, does the control proceed to step 603 which stores the broadcast reception timing. Otherwise, the control proceeds directly to step 604.

Steps 604 and 605 repeat the operation at steps 602 and 603 for all the possible broadcast reception timings.

After the operation at steps 602 and 603 for all the possible broadcast reception timings is completed, the control proceeds to steps 606, 607 and 605 which determines a broadcast transmission timing. That is, if there is at least one stored broadcast reception timing, the control proceeds from step 606 to step 607 where the broadcast transmission timing is determined to a timing which is different from the stored broadcast reception timing. On the other hand, if there is no stored broadcast reception timing, the control proceeds from step 606 to step 608 in which the broadcast transmission timing is arbitrarily determined. Note that an interval between the broadcast transmission timing and the stored broadcast reception timing is a time corresponding to one or more frames.

The flowchart of FIG. 6 is completed by step 609.

The operation of FIG. 6 is applied to a case where the base stations 1, 2, 3, 4, 5, 6 and 7 are sequentially powered ON as shown in FIGS. 7A, 7B, 8A, 8B, 9A, 9B, 10A, 10B, 11A, 11B, 12A, 12B, 13A, and 13B.

Figure 7A:
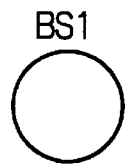
FIGS. 7A, 7B, 8A, 8B, 9A, 9B, 10A, 10B, 11A, 11E, 12A, 12B, 13A and 13B are diagrams for explaining the first operation of FIG. 6.
Figure 7B:
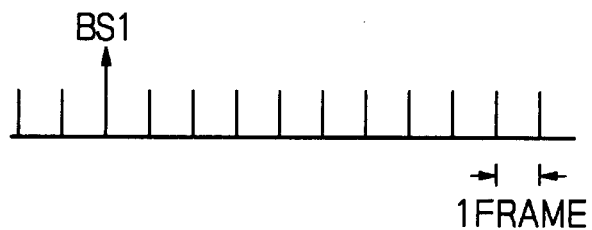

First, as shown in FIG. 7A the base station 1 is powered ON. In this case, since there is no stored broadcast reception timing, the base station 1 arbitrarily determines a broadcast transmission timing as shown in FIG. 7B.

Figure 8A:
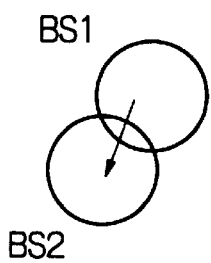
Figure 8B:
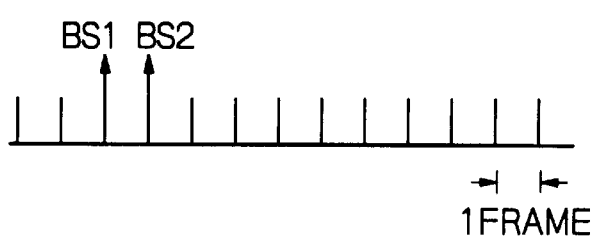

Next, as shown in FIG. 8A, the base station 2 is powered ON. In this case, since the broadcast signal of the base station 1 is received by the base station 2, so that there is a stored broadcast reception timing from the base station 1, the base station 2 determines a broadcast transmission timing different from the broadcast reception timing from the base station 1 as shown in FIG. 8B.

Figure 9A:
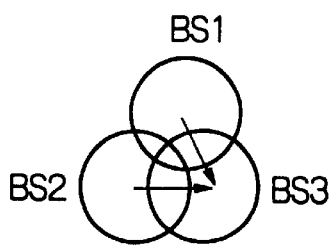
Figure 9B:
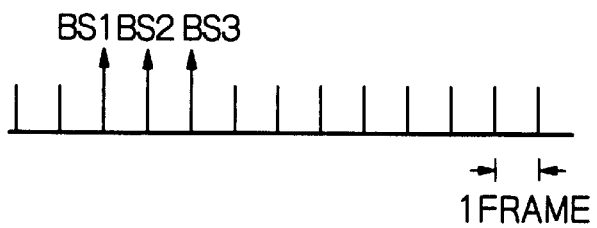

Next, as shown in FIG. 9A, the base station 3 is powered ON. In this case, since the broadcast signals of the base stations 1 and 2 are received by the base station 3, so that there are stored broadcast reception timings from the base stations 1 and 2. the base station 3 determines a broadcast transmission timing different from the broadcast reception timings from the base stations 1 and 2 as shown in FIG. 9B.

Figure 10A:
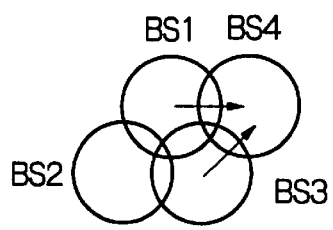
Figure 10B:
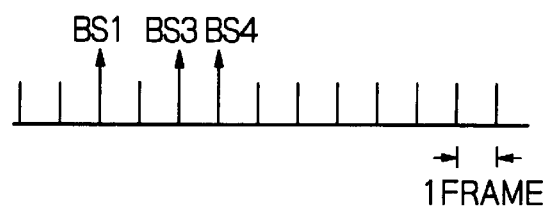

Next, as shown in FIG. 10A, the base station 4 is powered ON. In this case, since the broadcast signals of the base stations 1 and 3 are received by the base station 4, so that there are stored broadcast reception timings from the base stations 1 and 3, the base station 4 determines a broadcast transmission timing different from the broadcast reception timings from the base stations 1 and 3 as shown in FIG. 10B.

Figure 11A:
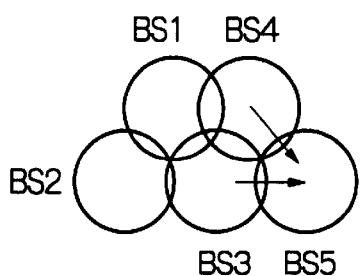
Figure 11B:
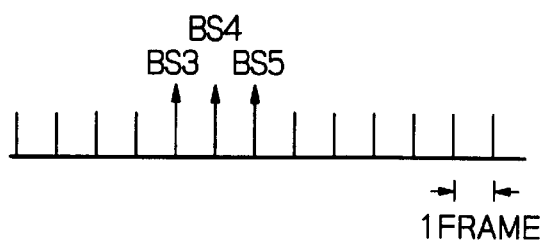

Next, as shown in FIG. 11A, the base station 5 is powered ON. In this case, since the broadcast signals of the base stations 3 and 4 are received by the base station 5, so that there are stored broadcast reception timings from the base stations 3 and 4, the base station 5 determines a broadcast transmission timing different from the broadcast reception timings from the base stations 3 and 4 as shown in FIG. 11B.

Figure 12A:
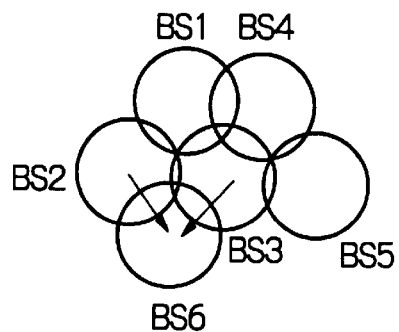
Figure 12B:

Next, as shown in FIG. 12A, the base station 6 is powered ON. In this case, since the broadcast signals of the base stations 2 and 3 are received by the base station 6, so that there are stored broadcast reception timings from the base stations 2 and 3, the base station 6 determines a broadcast transmission timing different from the broadcast reception timings from the base stations 2 and 3 as shown in FIG. 12B.

Figure 13A:
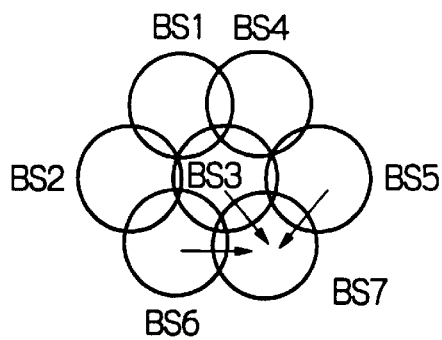
Figure 13B:
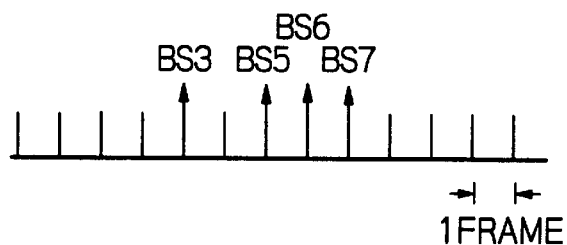

Finally, as shown in FIG. 13A, the base station 7 is powered ON. In this case, since the broadcast signals of the base stations 3, 5 and 6 are received by the base station 7, so that there are stored broadcast reception timings from the base stations 3, 5 and 6, the base station 7 determines a broadcast transmission timing different from the broadcast reception timings from the base stations 3, 5 and 6 as shown in FIG. 13B.

The operation of FIG. 6 is applied to a case where the base stations 1, 2, 3, 4, 5, 6 and 7 are sequentially powered ON as shown in FIGS. 14A, 14B, 15A, 15B, 16A, 16B, 17A, 17B, 18A, 18B, 19A, 19B, 20A and 20B.

Figure 14A:
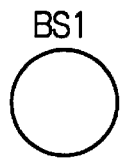
FIGS. 14A, 14B, 15A, 15B, 16A, 16B, 17A, 17B, 18A, 18B, 19A, 19B, 20A and 20B are other diagrams for explaining the first operation of FIG. 6.
Figure 14B:
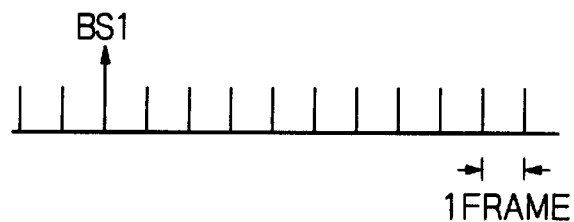

First, as shown in FIG. 14A the base station 1 is powered ON. In this case, since there is no stored broadcast reception timing. the base station 1 arbitrarily determines a broadcast transmission timing as shown in FIG. 14B.

Figure 15A:
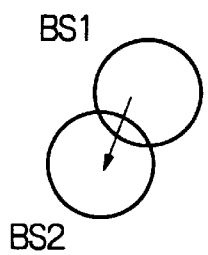
Figure 15B:
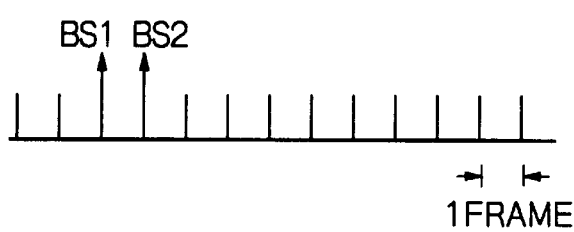

Next, as shown in FIG. 15A. the base station 2 is powered ON. In this case, since the broadcast signal of the base station 1 is received by the base station 2, so that there is a stored broadcast reception timing from the base station 1, the base station 2 determines a broadcast transmission timing different from the broadcast reception timing from the base station 1 as shown in FIG. 15B.

Figure 16A:
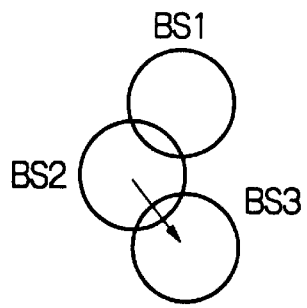
Figure 16B:

Next, as shown in FIG. 16A, the base station 3 is powered ON. In this case, since the broadcast signal of the base station 2 is received by the base station 3, so that there is a stored broadcast reception timing from the base station 2, the base station 3 determines a broadcast transmission timing different from the broadcast reception timing from the base station 2 as shown in FIG. 16B.

Figure 17A:
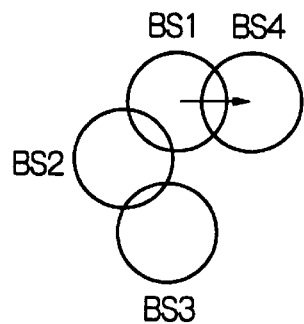
Figure 17B:

Next, as shown in FIG. 17A, the base station 4 is powered ON. In this case, since the broadcast signal of the base station 1 is received by the base station 4, so that there is a stored broadcast reception timing from the base station 1, the base staiton 4 determines a broadcast transmission timing different from the broadcast reception timing from the base station 1 as shown in FIG. 17B.

Figure 18A:
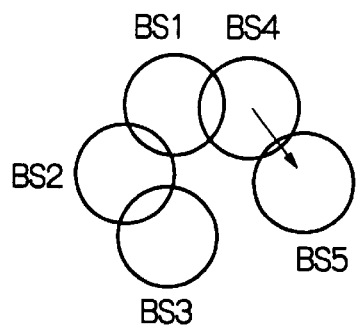
Figure 18B:
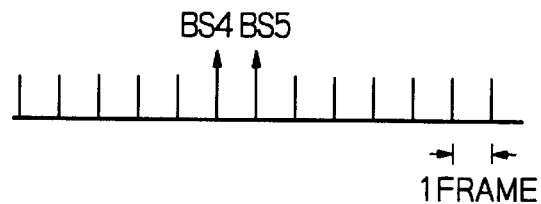

Next, as shown in FIG. 18A, the base station 5 is powered ON. In this case, since the broadcast signal of the base station 4 is received by the base station 5, so that there is a stored broadcast reception timing from the base station 4, the base station 5 determines a broadcast transmission timing different from the broadcast reception timing from the base station 4 as shown in FIG. 18B.

Figure 19A:
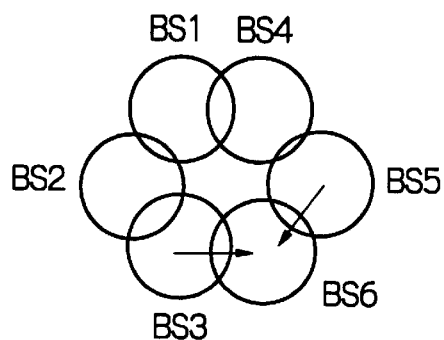
Figure 19B:
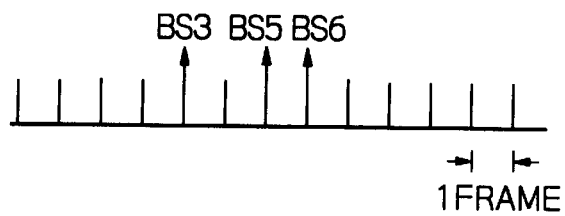

Next, as shown in FIG. 19A, the base station 6 is powered ON. In this case, since the broadcast signals of the base stations 3 and 5 are received by the base station 6, so that there are stored broadcast reception timings from the base stations 3 and 5, the base station 6 determines a broadcast transmission timing different from the broadcast reception timings from the base stations 3 and 5 as shown in FIG. 19B.

Figure 20A:
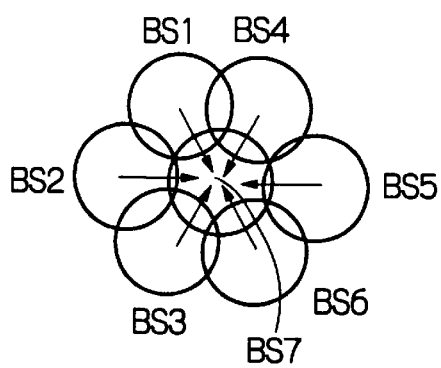
Figure 20B:
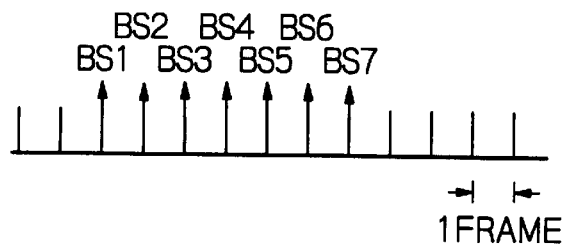

Finally, as shown in FIG. 20A, the base station 7 is powered ON. In this case, since the broadcast signals of the base stations 1, 2, 3, 4, 5 and 6 are received by the base station 7, so that there are stored broadcast reception timings from the base stations 1, 2, 3, 4, 5 and 6 the base station 7 determines a broadcast transmission timing different from the broadcast reception timings from the base stations 1, 2, 3, 4, 5 and 6 as shown in FIG. 20B.

In the above-described first operation as shown in FIG. 6, if the service area of a base station is not superposed on the service area of another base station, the broadcast transmission timings of the two base stations may be the same. For example, in FIGS. 16A and 16B, the broadcast transmission timing of the base station 3 can be the same as that of the base station 1. However, the service areas of the two base station are not superposed on onto each other, a problem hardly occurs.

A second operation of the timing control unit 13 of FIG. 4 is explained with reference to a flowchart of FIG. 21. The flowchart of FIG. 21 is started when the base station is powered ON.

Firstly, at step 2101, a broadcast reception timing is initially set for searching a broadcast signal from one of the other base stations.

Next, at step 2102, it is determined whether or not a broadcast signal is received at the reception synchronization establishment unit 12. Only if such a broadcast signal is received, does the control proceed to step 2105. Otherwise, the control proceeds to steps 2103 and 2104.

Steps 2103 and 2104 repeat the operation at step 2102 for all the possible broadcast reception timings.

At step 2105, the timing control unit 14 calculates a difference between a base station number allocated to one of the other base stations included in the received broadcast signal and a number allocated to the base station. Then, a broadcast transmission timing is determined in accordance with the difference in base station number.

On the other hand, if no broadcast signal is detected for all the possible broadcast reception timings, the control proceeds to step 2106 in which the broadcast transmission timing is arbitrarily determined.

The operation of FIG. 21 is applied to a case where the base stations 5, 8, 3, 1 and 9 are sequentially powered ON as shown in FIGS. 22A, 22B, 23A, 23B, 24A, 24B, 25A, 25B, 26A, and 26B.

Figure 22A:
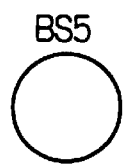
FIGS. 22A, 22B, 23A, 23B, 24A, 24B, 25A, 25B, 26A and 26B are diagrams for explaining the first operation of FIG. 21.
Figure 22B:
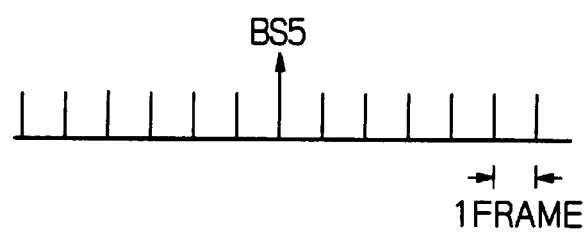

First, as shown in FIG. 22A, the base station 5 is powered ON. In this case, since there is no broadcast reception signal during a search period, the base station 5 arbitrarily determines a broadcast transmission timing as shown in FIG. 22B.

Figure 23A:
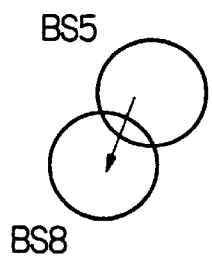
Figure 23B:

Next, as shown in FIG. 23A, the base station B is powered ON. In this case, since the broadcast signal of the base station 5 is received by the base station 2, the base station 8 determines a broadcast transmission timing different by +3 frames from the broadcast reception from the base station 5 as shown in FIG. 23B.

The flowchart of FIG. 21 is completed by step 2107.

Figure 24A:
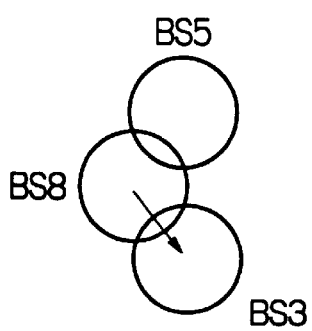
Figure 24B:

Next, as shown in FIG. 24A, the base station 3 is powered ON. In this case, since the broadcast signal of the base station 8 is received by the base station 3, the base station 3 determines a broadcast transmission timing different by −5 frames from the broadcast reception timing from the base station 5 as shown in FIG. 24B.

Figure 25A:
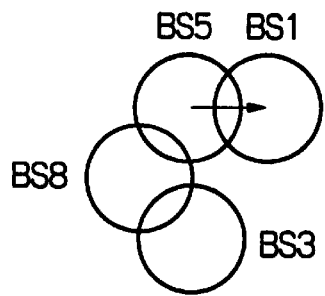
Figure 25B:
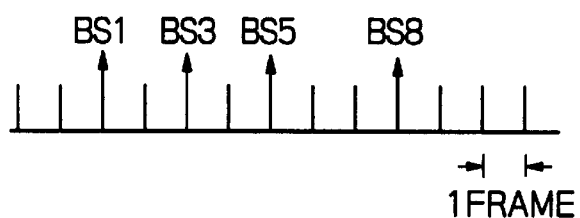

Next, as shown in FIG. 25A, the base station 1 is powered ON. In this case, since the broadcast signal of the bass station 5 is received by the base station 1, the base station 1 determines a broadcast transmission timing different by −4 frames from the broadcast reception timing from the base station 5 as shown in FIG. 25B.

Figure 26A:
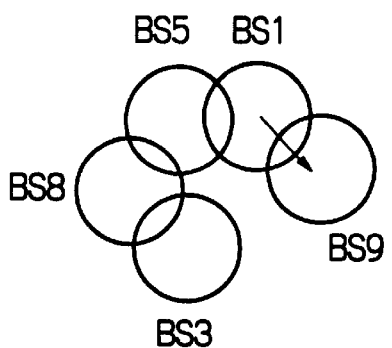
Figure 26B:
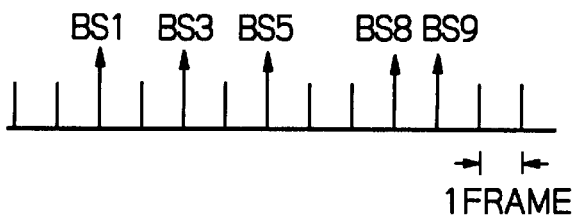

Finally, as shown in FIG. 26A, the base station is powered ON. In this case, since the broadcast signal of the base station 1 is received by the base station 9, the base station 9 determines a broadcast transmission timing different by +8 frames from the broadcast reception timing from the base station 1 as shown in FIG. 26B.

In the above-mentioned second operation as shown in FIG. 21, since the base station numbers are peculiar thereto, the broadcast transmission timings of the base numbers are completely different from each other.

As explained hereinabove, according to the present invention, since each of the base stations can establish broadcast transmission timing, i.e., frame synchronization, without interfering with the other base stations, a special control unit for establishing frame synchronization over the base stations is unnecessary. Also, a mobile station is unnecessary for establishing the frame synchronization. Further, after the frame synchronization of the entire system is established, even when an additional base station is provided in the entire system, the frame synchronization of the additional base station can be established without changing the entire system.

What is claimed is:

1. A time divisional multiple access type mobile communication system including a plurality of base stations, wherein each of said stations comprises:
   a receiver for receiving broadcast signals from the base stations other than said each of said base stations;
   a first processing device for determining a broadcast transmission timing in synchronization with and different from timings of said received broadcast signals; and
   a transmitter for transmitting a broadcast signal at said broadcast transmission timing.

2. The system as set forth in claim 1, wherein said each of said base stations further comprises a second processing device for determining said broadcast transmission timing at an arbitrary timing when said broadcast signals are not received.

3. The system as set forth in claim 1, wherein a difference between said broadcast transmission timing and a timing of each of said received broadcast signals is a time corresponding to one or more frames predetermined by said system.

4. The system as set forth in claim 1, wherein said first processing device comprises:
   a calculating device for calculating a difference in base station number between said each of said base stations and one of the other base stations transmitting a received broadcast signal; and
   a broadcast determination device for determining said broadcast transmission timing in accordance with said difference in base station number.

5. A time divisional multiple access type mobile communication system including a plurality of base stations, wherein each of said base stations comprises:
   a receiver for receiving broadcast signals from the base stations other than said each of said base stations after said each of said base stations is powered ON;
   a first processing device for determining a broadcast transmission timing in synchronization with and different from timing of said received broadcast signals when said broadcast signals are received;
   a second processing device for determining said broadcast transmission timing at an arbitrary timing when said broadcast signals are not received; and
   a transmitter for transmitting a broadcast signals at said broadcast transmission timing.

6. A time divisional multiple access type mobile communication system including a plurality of base stations, wherein each of said base stations comprises:
   a receiver for receiving a broadcast signal from one of the other base stations than said each of said base stations after said each of said base stations is powered ON.
   a calculating device for calculating a difference in base station number between said each of said base stations and said one of the other base stations when said broadcast signal is received;
   a first processing device for determining a broadcast transmission timing in synchronization with and different from a timing of said received broadcast signal, a difference in time between said broadcast transmission timing and the timing of said received broadcast signal depending upon said difference in base station number;
   a second processing device for determining said broadcast transmission timing at an arbitrary timing when said broadcast signal is not received; and
   a transmitter for transmitting a broadcast signal at said broadcast transmission timing.

7. A method for establishing a frame synchronization among a plurality of base stations in a time divisional multiple access type mobile communication system, said method comprising:
   receiving broadcast signals from the base stations other than each of said base stations;
   determining a broadcast transmission timing in synchronization with and different from timings of said received broadcast signals; and
   transmitting a broadcast signal at said broadcast transmission timing.

8. The method as set forth in claim 7, further comprising determining said broadcast transmission timing at an arbitrary timing when said broadcast signals are not received.

9. The method as set forth in claim 7, wherein a difference between said broadcast transmission timing and a timing of each of said received broadcast signals is a time corresponding to one or more frames predetermined by said system.

10. The method as set forth in claim 7, wherein determining a broadcast transmission timing comprises:
    calculating a difference in base station number between said each of said base stations and one of the other base stations transmitting a received broadcast signal; and
    determining said broadcast transmission timing in accordance with said difference in base station number.

11. A method for establishing a frame synchronization among a plurality of base stations in a time divisional multiple access type mobile communication system, said method comprising:
    receiving broadcast signals from the base stations other than each of said base stations after said each of said base stations is powered ON;
    determining a broadcast transmission timing in synchronization with and different from timings of said received broadcast signals when said broadcast signals are received;
    determining said broadcast transmission timing at an arbitrary timing when said broadcast signals are not received; and
    transmitting a broadcast signal at said broadcast transmission timing.

12. A method for establishing a frame synchronization among a plurality of base stations in a time divisional multiple access type mobile communication system, said method comprising:
    receiving a broadcast signal from one of the base stations other than each of said base stations after said each of said base stations is powered ON;
    calculating a difference in base station number between said each of said base stations and said one of the other base stations when said broadcast signal is received;
    determining a broadcast transmission timing in synchronization with and different from a timing of said received broadcast signal, a difference in time between said broadcast transmission timing and the timing of said received broadcast signal depending upon said difference in base station number;

determining said broadcast transmission timing at an arbitrary timing when said broadcast signal is not received; and transmitting a broadcast signal at said broadcast transmission timing.

13. A time divisional multiple access type mobile communication system comprising:

a first base station comprising a transmitter; and a second base station comprising a receiver configured to receive a broadcast signal from the transmitter of the first base station, a processing device configured to determine a broadcast transmission timing in synchronization with and different from timings of said received broadcast signals, and a transmitter for transmitting a broadcast signal at said broadcast transmission timing.

14. The system as set forth in claim 13, wherein when the first base station has a base station number X and a broadcast transmission timing frame of Y and the second base station has a base station number Z, said broadcast transmission timing is X−Z+Y.

15. The system as set forth in claim 13, further comprising:

a third base station comprising a second receiver configured to receive a broadcast signal from the transmitter of the first and second base stations, a second processing device configured to determine a broadcast transmission timing in synchronization with and different from timings of said received broadcast signals from the first and second base stations, and a transmitter for transmitting a broadcast signal at said broadcast transmission timing.

* * * * *